(12) United States Patent
Yoshida

(10) Patent No.: US 10,816,825 B2
(45) Date of Patent: Oct. 27, 2020

(54) HEAD-MOUNTED DISPLAY

(71) Applicant: SONY CORPORATION, Tokyo (JP)

(72) Inventor: Takaaki Yoshida, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/275,661

(22) Filed: Feb. 14, 2019

(65) Prior Publication Data

US 2019/0187491 A1 Jun. 20, 2019

Related U.S. Application Data

(63) Continuation of application No. 15/036,614, filed as application No. PCT/JP2014/005122 on Oct. 8, 2014, now Pat. No. 10,234,699.

(30) Foreign Application Priority Data

Nov. 26, 2013 (JP) ................. 2013-243868

(51) Int. Cl.
*G02C 9/00* (2006.01)
*G02C 5/12* (2006.01)
(Continued)

(52) U.S. Cl.
CPC ........... *G02C 9/00* (2013.01); *G02B 27/0172* (2013.01); *G02B 27/0176* (2013.01); *G02C 5/126* (2013.01); *G02C 9/04* (2013.01); *G02C 11/10* (2013.01); *G02B 2027/0156* (2013.01); *G02B 2027/0158* (2013.01); *G02B 2027/0178* (2013.01); *G02C 5/12* (2013.01); *H04N 5/64* (2013.01)

(58) Field of Classification Search
CPC . G02C 9/00; G02C 9/04; G02C 5/126; G02C 5/12; G02C 5/122
USPC .................................................. 351/57, 138
See application file for complete search history.

(56) References Cited

U.S. PATENT DOCUMENTS 4,511,226 A 4/1985 Freeman
5,790,230 A 8/1998 Sved
(Continued)

FOREIGN PATENT DOCUMENTS

EP 2064586 A1 6/2009
JP 2005-156644 A 6/2005
(Continued)

OTHER PUBLICATIONS

International Preliminary Report on Patentability of PCT Application No. PCT/JP2014/005122, dated Jun. 9, 2016, 08 pages of English Translation and 04 pages of IPRP.
(Continued)

*Primary Examiner* — Kristina M Deherrera
(74) *Attorney, Agent, or Firm* — Chip Law Group

(57) ABSTRACT

A head-mounted display according to an embodiment of the present technology includes a main body, a nose pad, and a holding mechanism. The main body includes a display portion capable of presenting an image to a user and is configured to be mountable on a head of the user. The nose pad is configured to be attachable to and detachable from the main body. The holding mechanism is configured to be capable of holding correction glasses between the main body and the nose pad mounted to the main body, the correction glasses facing the display portion.

11 Claims, 8 Drawing Sheets

(51) Int. Cl.
*G02C 9/04* (2006.01)
*G02B 27/01* (2006.01)
*G02C 11/00* (2006.01)
*H04N 5/64* (2006.01)

(56) References Cited

U.S. PATENT DOCUMENTS

| | | | |
|---|---|---|---|
| 6,290,354 | B1 | 9/2001 | Safran |
| 6,386,703 | B1 | 5/2002 | Huang |
| 6,948,810 | B1 * | 9/2005 | Kim .................. G02C 9/04 351/138 |
| 7,782,589 | B2 | 8/2010 | Menduni et al. |
| 8,931,893 | B2 | 1/2015 | Chen |
| 10,234,699 | B2 * | 3/2019 | Yoshida ............. G02B 27/0172 |
| 2007/0064194 | A1 | 3/2007 | Kim |
| 2008/0068557 | A1 | 3/2008 | Menduni et al. |
| 2012/0062446 | A1 | 3/2012 | Sugiyama |
| 2014/0028968 | A1 | 1/2014 | Olsson et al. |

FOREIGN PATENT DOCUMENTS

| | | |
|---|---|---|
| JP | 2007-286210 A | 11/2007 |
| JP | 2010-504546 A | 2/2010 |
| JP | 2013-171224 A | 9/2013 |
| WO | 2008/034824 A1 | 3/2008 |

OTHER PUBLICATIONS

Non Final-Office Action for U.S. Appl. No. 15/036,614, dated Sep. 1, 2017, 15 pages.

Final-Office Action for U.S. Appl. No. 15/036,614, dated Jan. 11, 2018, 12 pages.

Advisory Action for U.S. Appl. No. 15/036,614, dated Mar. 9, 2018, 04 pages.

Non Final-Office Action for U.S. Appl. No. 15/036,614, dated May 11, 2018, 14 pages.

Notice of Allowance for U.S. Appl. No. 15/036,614, dated Oct. 31, 2018, 27 pages.

International Search Report & Written Opinion of PCT Application No. PCT/JP2014/005122, dated Dec. 22, 2014, 07 pages of English Translation and 07 pages of ISRWO.

Final Office Action for U.S. Appl. No. 15/036,614, dated Sep. 1, 2017, 07 pages of Office Action.

Non-Office Action for U.S. Appl. No. 15/036,614, dated May 11, 2018, 08 pages of Office Action.

* cited by examiner

HEAD-MOUNTED DISPLAY

CROSS REFERENCE TO RELATED APPLICATIONS

The present application is a continuation application of U.S. patent application Ser. No. 15/036,614, filed on May 13, 2016, which is a National Stage Entry of Patent Application No. PCT/JP2014/005122 filed on Oct. 8, 2014, which claims priority from prior Japanese Patent Application JP 2013-243868 filed in the Japan Patent Office on Nov. 26, 2013, the entire contents of which are hereby incorporated by reference.

TECHNICAL FIELD

The present technology relates to a head-mounted display that is mounted on the head of a user for use.

BACKGROUND ART

There is known a head-mounted display (hereinafter, also referred to as HMD) that is configured to be mounted on the head of a user to present an image to the individual user by a display disposed in front of the eyes of the user.

In order to achieve visibility of images, an improved design quality, downsizing, or the like, the HMD is designed such that a large space is not generated between the face of a user and the HMD when the user wears the HMD. Therefore, for example, a user who uses glasses for visual acuity correction has had a problem in wearability of the HMD because of little space for arranging the glasses. For that reason, there is proposed an HMD that is configured such that a correction lens for correcting visual acuity can be attached thereto (see Patent Document 1).

Patent Document 1: Japanese Patent Application Laid-open No. 2013-171224

SUMMARY OF INVENTION

Problem to be Solved by the Invention

However, the HMD described in Patent Document 1 has had a design problem because a lock mechanism for the correction lens is exposed on an appearance surface around a display portion disposed in front of eyes of a user. Further, due to a large number of components of the lock mechanism, there has been a problem in that the structure is complicated and assemblability is lowered.

In view of the circumstances as described above, it is an object of the present technology to provide a head-mounted display that is capable of holding glasses for visual acuity correction by a simple configuration.

Means for Solving the Problem

In order to achieve the above-mentioned object, according to an embodiment of the present technology, there is provided a head-mounted display including a main body, a nose pad, and a holding mechanism.

The main body includes a display portion capable of presenting an image to a user and is configured to be mountable on a head of the user.

The nose pad is configured to be attachable to and detachable from the main body.

The holding mechanism is configured to be capable of holding correction glasses between the main body and the nose pad mounted to the main body, the correction glasses facing the display portion.

The head-mounted display is configured to be capable of holding the correction glasses by the holding mechanism provided between the main body and the nose pad, and can thus hold the correction glasses by a simple configuration.

As the correction glasses, typically, visual acuity correction glasses correspond thereto. In addition thereto, glasses having various optical functions of an optical filter and the like can be adopted.

The holding mechanism may include an engaging portion and a mount portion. The engaging portion is provided to the main body and is configured to be engageable with a bridge portion of the correction glasses. The mount portion is provided to the nose pad, and faces the engaging portion in a first axial direction and covers the bridge portion engaged with the engaging portion.

This can enhance designability of an appearance surface around the display portion disposed in front of the eyes of a user.

The nose pad may further include a pair of pad portions, and the mount portion may be formed between the pair of pad portions.

Typically, various types of nose pads are prepared to be selectable depending on the size or shape of the nose of a user. According to the configuration described above, it is possible to manufacture various types of nose pads each having a common configuration of the mount portion and an optimized shape of the pair of pad portions and the like depending on a user.

The nose pad may be mounted to the main body along a second axial direction orthogonal to the first axial direction.

This can improve attaching and detaching operability of the correction glasses with respect to the main body.

The holding mechanism may further include a hole portion and a shaft portion. The hole portion is provided to the main body and formed along the second axial direction. The shaft portion is provided to the nose pad and is configured to be capable of being fit into the hole portion.

This can ensure positioning accuracy of the nose pad with respect to the main body.

According to another embodiment of the present technology, there is provided a head-mounted display including a main body, a nose pad, correction glasses, and a holding mechanism.

The main body includes a display portion capable of presenting an image to a user and is configured to be mountable on a head of the user.

The nose pad is configured to be attachable to and detachable from the main body.

The correction glasses are disposed to face the display portion.

The holding mechanism is configured to be capable of holding the correction glasses between the main body and the nose pad mounted to the main body.

The head-mounted display is configured to be capable of holding the correction glasses by the holding mechanism provided between the main body and the nose pad, and can thus hold the correction glasses by a simple configuration.

Typically, the correction glasses include two lens portions and a bridge portion that couples the two lens portions to each other. In this case, the holding mechanism may include an engaging portion and a mount portion. The engaging portion is provided to the main body and is configured to be engageable with the bridge portion. The mount portion is provided to the nose pad, and faces the engaging portion in a first axial direction and covers the bridge portion engaged with the engaging portion.

This can enhance designability of an appearance surface around the display portion disposed in front of the eyes of a user.

The bridge portion may include a shaft portion protruding in the first axial direction, and the holding mechanism may further include a hole portion that is formed in a bottom portion of the engaging portion and into which the shaft portion is fit.

This can ensure positioning accuracy of the bridge portion with respect to the engaging portion.

The correction glasses may be disposed on the inner side (back side) of the display portion or disposed on the outer side (front side) of the display portion. For example, for a user who has difficulty in seeing a display image on the display portion or a distant landscape due to myopia or the like, it is suitable to dispose the correction glasses on the inner side of the display portion. On the other hand, for a user having difficulty in seeing a near view due to hyperopia or the like, it is suitable to dispose the correction glasses on the outer side of the display portion.

Effects of the Invention

As described above, according to the present technology, it is possible to hold glasses for visual acuity correction by a simple configuration.

It should be noted that the effects described herein are not necessarily limited and any effect described in this disclosure may be produced.

MODE(S) FOR CARRYING OUT THE INVENTION

Hereinafter, embodiments of the present technology will be described with reference to the drawings.

First Embodiment

Figure 1:
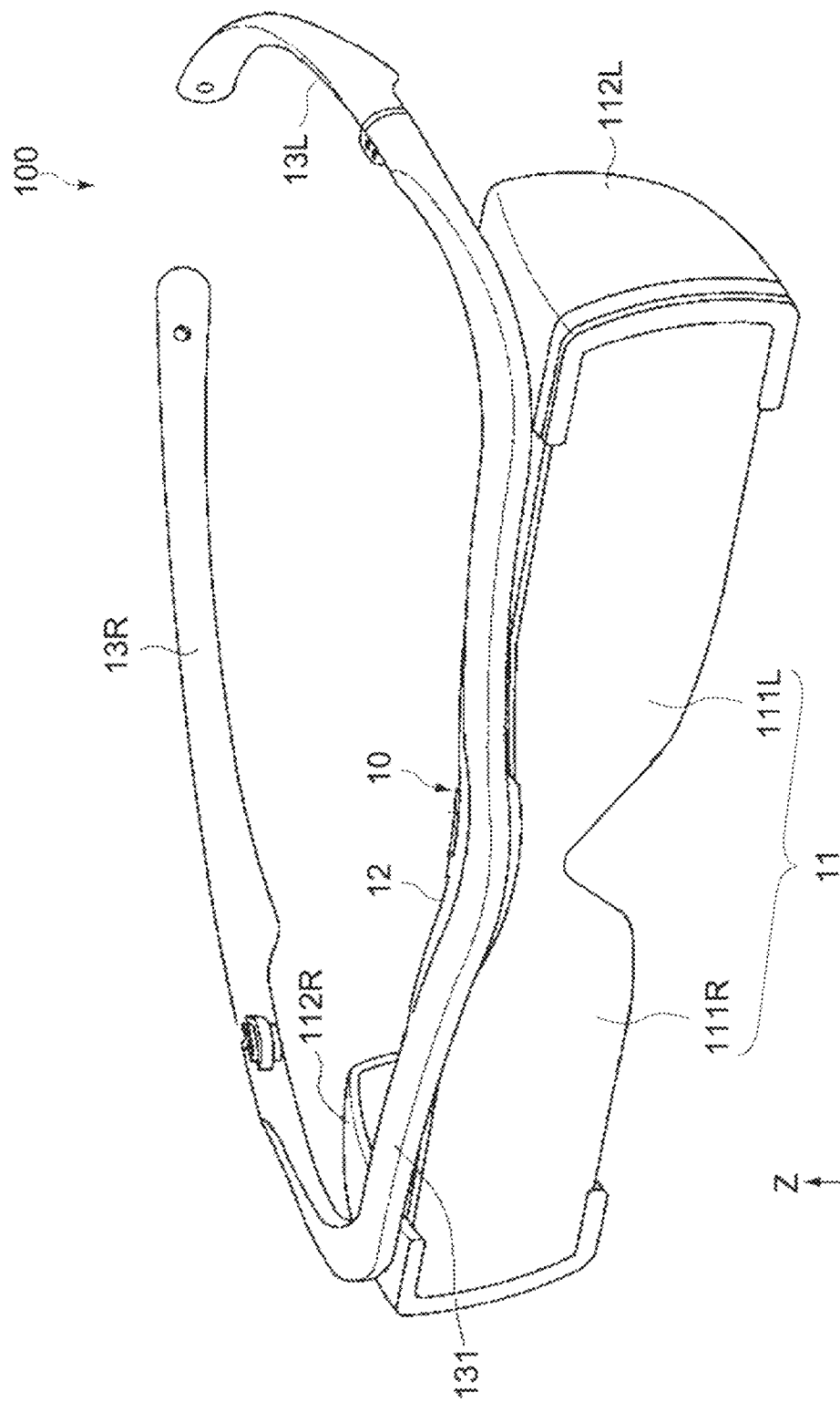
FIG. 1 is an overall perspective view of a head-mounted display viewed from the front side according to a first embodiment of the present technology.
Figure 2:
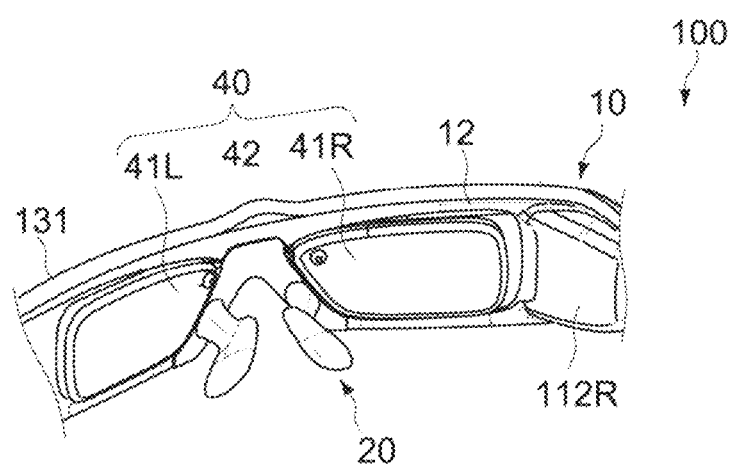
FIG. 2 is a perspective view of a main part of the head-mounted display when viewed from the back side.
Figure 2:
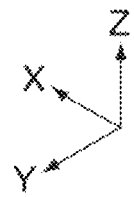

FIGS. 1 and 2 each show a head-mounted display according to a first embodiment of the present technology. FIG. 1 is an overall perspective view when viewed from the front side, and FIG. 2 is a perspective view of a main part when viewed from the back side. In each figure, X, Y, and Z axes are three axial directions orthogonal to one another, and the X axis represents a front and back direction, the Y axis represents a right and left direction, and the Z axis represents a height direction.

[Configuration of Head-Mounted Display]

A head-mounted display 100 of this embodiment includes a main body 10 and a nose pad 20.

(Main Body)

The main body 10 includes a display portion 11 capable of presenting an image to a user and is configured to be mountable on the head of the user. Specifically, the main body 10 includes the display portion 11, a frame portion 12 that supports the display portion 11, and temple portions 13R and 13L that are fixed to the frame portion 12.

The display portion 11 includes display plates 111R and 111L and optical units 112R and 112L. An image presented to the user by the display portion 11 may be a 2D image or 3D image.

The display plates 111R and 111L are disposed in front of the eyes of the user and are configured to be capable of displaying images to be presented to the user. The display plate 111R displays a right-eye image, and the display plate 111L displays a left-eye image. In this embodiment, the display plates 111R and 111L are constituted by translucent light guide plates that are capable of outputting images to the right eye and the left eye of the user, respectively, the images being projected from the optical units 112R and 112L. The display plates 111R and 111L may be constituted by a common member or different members.

The optical units 112R and 112L are fixed to a right-side edge portion and a left-side edge portion of the frame portion 12, respectively, and project a right-eye image and a left-eye image to the display plates 111R and 111L, respectively. The structure of the optical units 112R and 112L is not particularly limited as long as images can be projected to the display plates 111R and 111L. Typically, the optical units 112R and 112L each have an image forming element, an optical prism that projects an image formed by the image forming element to the display plate 111R or 111L, a cabinet that contains those components, and the like. As the image forming element, a liquid crystal panel may be used or a self-emitting panel such as an LED and an EL element may be used.

The frame portion 12 is a frame body including rims that support the respective display plates 111R and 111L and a bridge that couples those components. The frame portion 12 is constituted by a metal material such as a magnesium alloy or an aluminum alloy.

The temple portions 13R and 13L extend backward from the right edge and the left edge of the frame portion 12, respectively, and are formed into a shape mountable on both sides of the head and upper portions of both ears of the user. The temple portions 13R and 13L are constituted by a synthetic resin material that is moderately deformable with respect to the frame portion 12, or the like. In this embodiment, the temple portions 13R and 13L are constituted by a single member by being coupled to each other via a coupling portion 131 fixed to the upper surface of the frame portion 12, but may not be limited thereto and may be constituted by different members.

(Nose Pad)

The nose pad 20 is configured to be attachable to and detachable from the frame portion 12 of the main body 10. The nose pad 20 abuts on the nose of the user who wears the head-mounted display 100, and thus the display portion 11 is disposed in front of the eyes of the user. Typically, various types of nose pads 20 are prepared to be selectable depending on the size or shape of the nose of the user.

Figure 3:
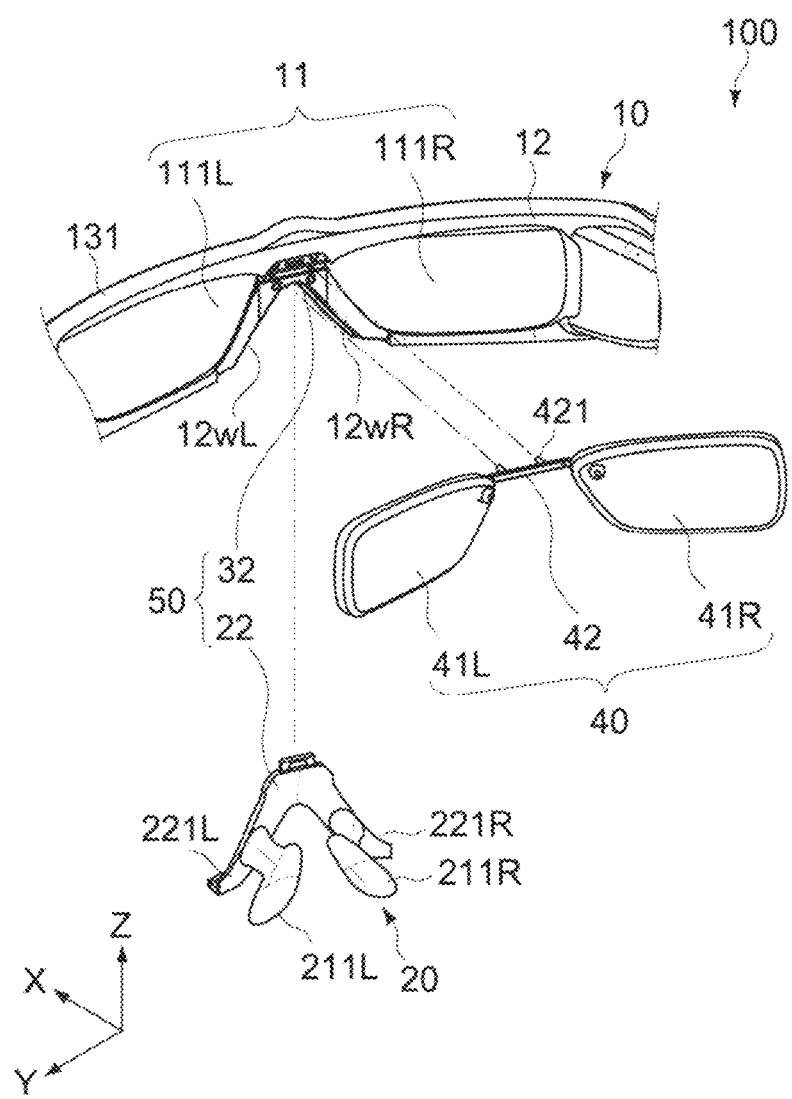
FIG. 3 is an exploded perspective view showing a state where a nose pad and correction glasses are detached from a main body in the head-mounted display.

FIG. 3 is an exploded perspective view of a main part of the head-mounted display 100, showing a state where the nose pad 20 and correction glasses 40 are detached from the main body 10.

The nose pad 20 is constituted by an injection-molded body made of a synthetic resin material, for example. The nose pad 20 includes a pair of pad portions 211R and 211L and a mount portion 22 that is formed between the pair of pad portions 211R and 211L. The mount portion 22 includes two arm portions 221R and 221L that are engageable with right and left rim portions 12wR and 12wL, respectively. The rim portions 12wR and 12wL are located at a lower edge of the center portion of the frame portion 12. The pad portions 211R and 211L are integrally provided to those arm portions 221R and 221L, respectively.

The nose pad 20 also has a function as a holding tool of the correction glasses 40, which are arbitrarily mounted to the head-mounted display 100. The correction glasses 40 are disposed to face the display portion 11 in an X-axis direction (first axial direction). In this embodiment, the correction glasses 40 are constituted by visual acuity correction glasses and disposed on the inner side (back side) of the display portion 11.

The correction glasses 40 includes a pair of lens portions 41R and 41L and a bridge portion 42 that couples those lens portions 41R and 41L. The pair of lens portions 41R and 41L is constituted by a glass material or a transparent plastic material, for example. The bridge portion 42 is constituted by a metal material, for example. The correction glasses 40 are sandwiched between the main body 10 and the nose pad 20, and thus fixed to a position facing the inner surface of the display portion 11.

The correction glasses 40 are typically constituted by correction lenses that are designed for a user who has difficulty in seeing an image presented by the display portion 11 (AR image set at infinity) or a distant landscape due to myopia or the like. The correction glasses 40 are constituted as exclusive goods for the head-mounted display 100, but may not be limited thereto as a matter of course and may be a general-purpose article on the market or the like.

The head-mounted display 100 further includes a holding mechanism 50 that is capable of holding the correction glasses 40 facing the display portion 11. The holding mechanism 50 is provided between the main body 10 and the nose pad 20 mounted to the main body 10.

Hereinafter, details of the holding mechanism 50 will be described together with the detailed configurations of the nose pad 20 and the frame portion 12.

(Holding Mechanism)

Figure 4A:
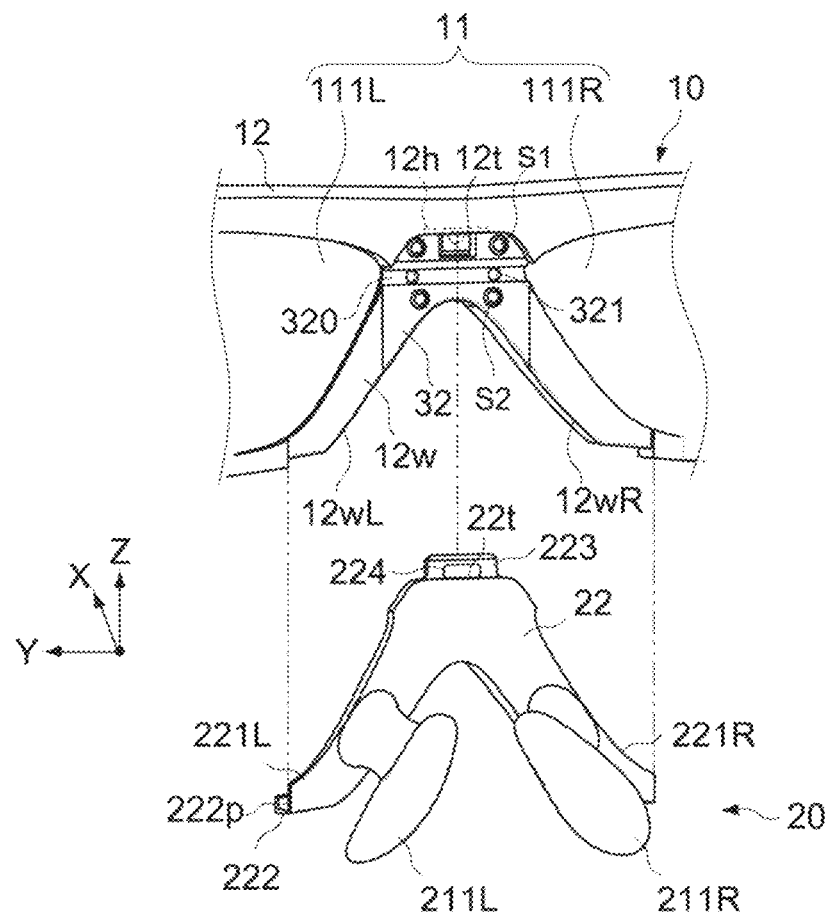
FIGS. 4A and 4B are perspective views of a main part, showing a state where the nose pad is detached from the main body and a state where the nose pad is mounted to the main body in the head-mounted display.
Figure 4B:
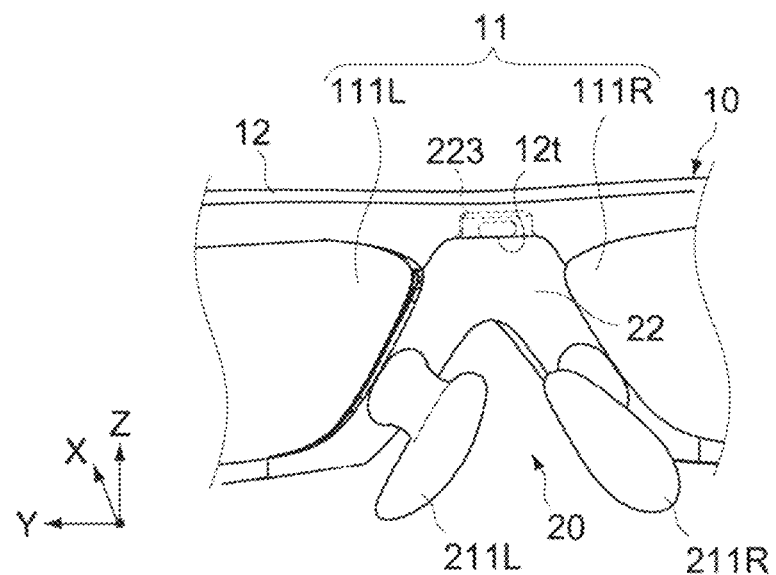
Figure 5A:
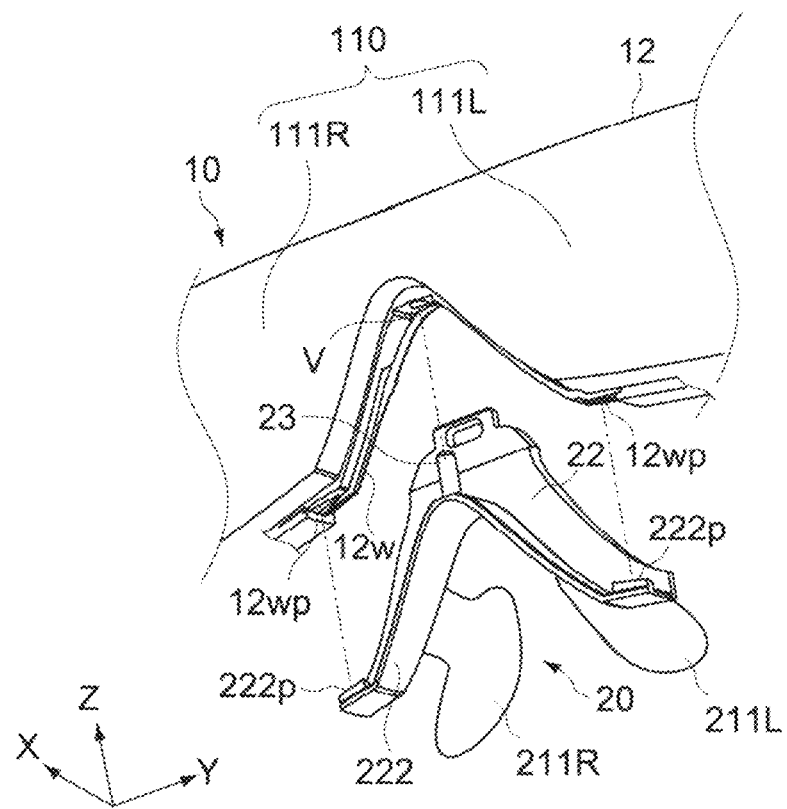
FIGS. 5A and 5B are perspective views of a main part, showing a state where the nose pad is detached from the main body and a state where the nose pad is mounted to the main body in the head-mounted display.
Figure 5B:
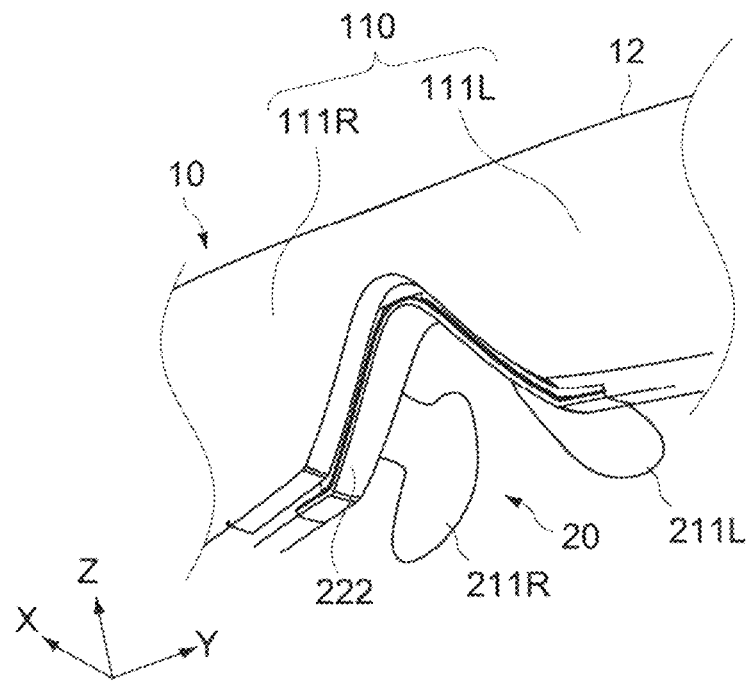
Figure 6:
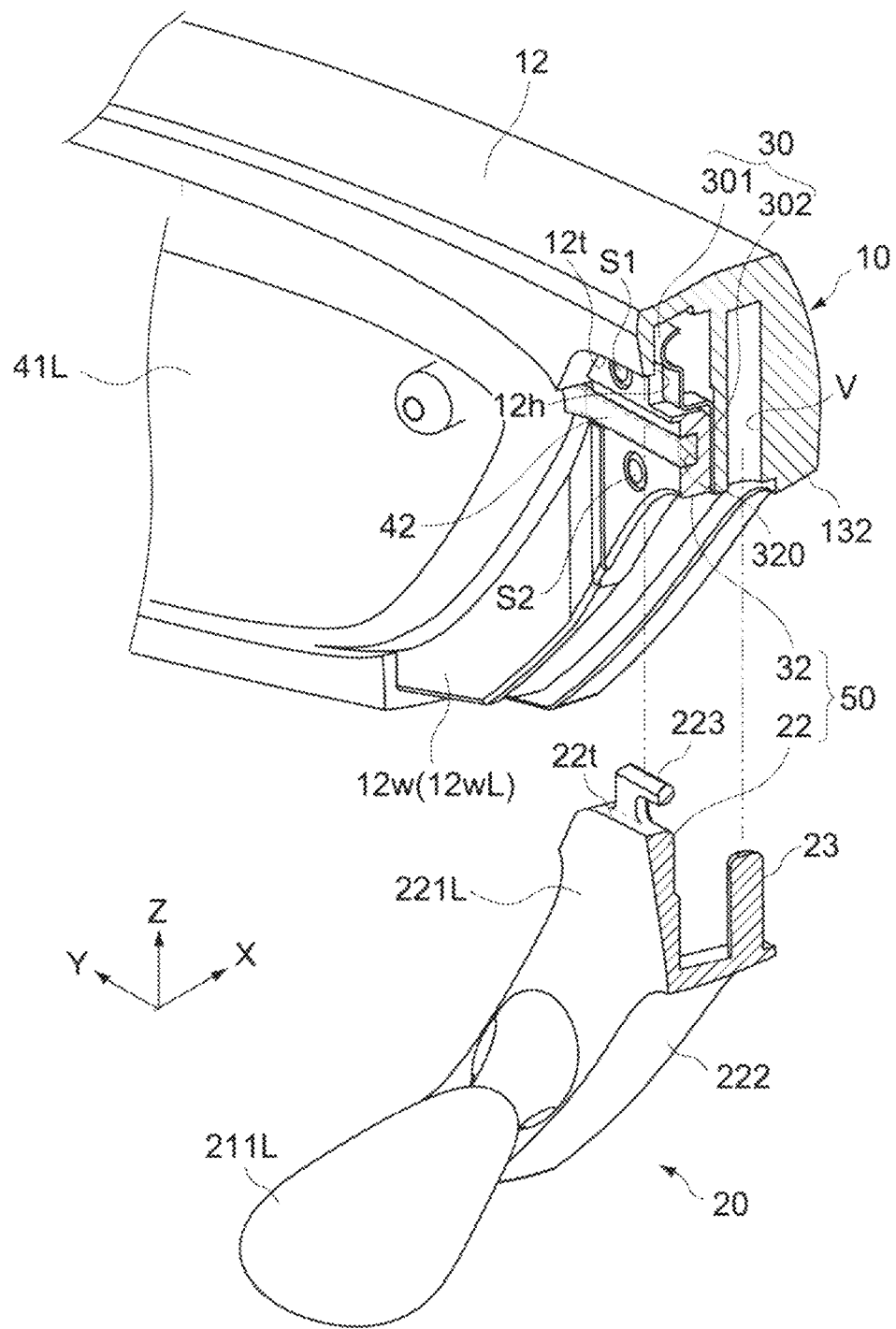
FIG. 6 is a longitudinal sectional perspective view of a main part, showing a state where the nose pad is detached from the main body in the head-mounted display.
Figure 7:
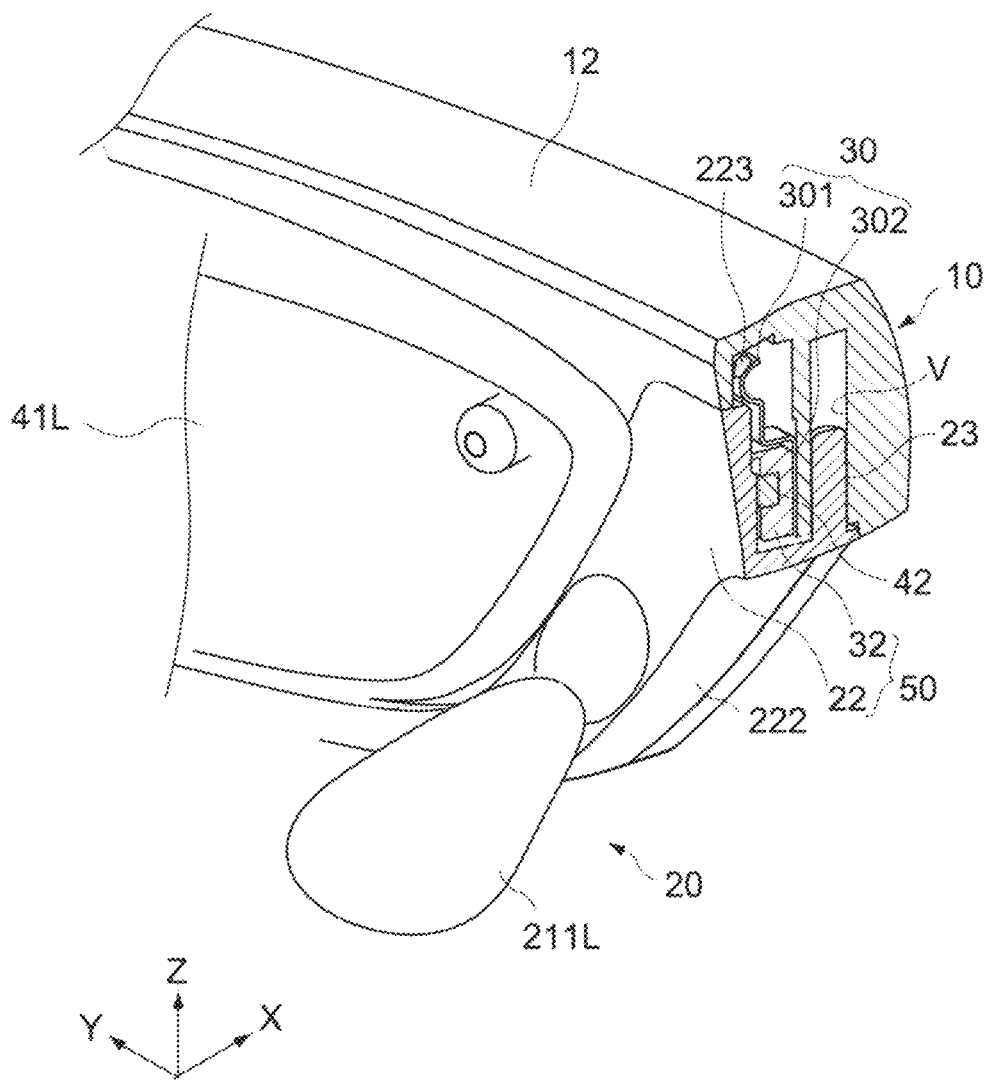
FIG. 7 is a longitudinal sectional perspective view of a main part, showing a state where the nose pad is mounted to the main body in the head-mounted display.

FIGS. 4A and 4B are perspective views of a main part on the back side of the display portion 11, respectively showing a non-mounted state and a mounted state of the nose pad 20. FIGS. 5A and 5B are perspective views of a main part on the front side thereof. FIGS. 6 and 7 are each a longitudinal sectional perspective view of the center portion of the main body 10, respectively showing a non-mounted state and a mounted state of the nose pad 20.

The nose pad 20 is configured to be attachable to and detachable from the main body 10 along a Z-axis direction (second axial direction). The nose pad 20 is mounted to the center of the frame portion 12 from the lower portion of the main body 10. The mount portion 22 of the nose pad 20 is formed into an inverted V shape, which corresponds to a thin-walled portion 12w formed at the center of the frame portion 12. The mount portion 22 covers the thin-walled portion 12w from the inner side such that the arm portions 221R and 221L face the rim portions 12wR and 12wL of the thin-walled portion 12w, respectively.

The mount portion 22 includes a flange portion 222. As shown FIGS. 5A and 5B, the flange portion 222 is formed so as to protrude forward (positive X direction) from a lower edge of the mount portion 22 having the inverted V shape, along the lower edge. The flange portion 222 is disposed to face the lower edge of the frame portion 12 (thin-walled portion 12w) when the nose pad 20 is mounted to the main body 10.

The flange portion 222 is provided with projection portions 222p, which protrude upward, at positions corresponding to tips of the arm portions 221R and 221L. The projection portions 222p are configured to be engaged with engaging holes 12wp when the nose pad 20 is mounted to the main body 10. The engaging holes 12wp are formed in the bottom surfaces of the rim portions 12wR and 12wL.

The flange portion 222 is further provided with a reference pin 23 (shaft portion), which protrudes upward, at a position corresponding to the top portion thereof. The reference pin 23 is configured so as to be fit into a reference hole V (hole portion) when the nose pad 20 is mounted to the main body 10. The reference hole V is formed in the bottom surface of the center portion of the frame portion 12. The reference hole V is constituted by a circular hole formed along the Z-axis direction and having a predetermined depth, and is also used for adjustment of an optical system of the display portion 11. In this embodiment, the reference hole V doubles as a positioning reference of the nose pad 20.

As shown in FIG. 4A, the mount portion 22 is provided with a protruding piece 223 including an engaging hole 224. The protruding piece 223 protrudes upward from a top portion 22t of the mount portion 22 and is constituted by a wall portion having a longitudinal direction in a Y-axis direction. The engaging hole 224 is formed of a long hole, which is formed to penetrate the protruding piece 223 in the X-axis direction and has a long axis in the Y-axis direction. The protruding piece 223 is inserted into a rectangular hole 12h when the nose pad 20 is mounted to the main body 10. The rectangular hole 12h is provided at an upper end portion 12t of the thin-walled portion 12w.

As shown in FIGS. 6 and 7, inside the rectangular hole 12h, an elastic protrusion portion 301 that is engageable with the engaging hole 224 is provided. The elastic protrusion portion 301 is disposed at a position at which the elastic protrusion portion 301 is engaged with the engaging hole 224, when the top portion 22t of the mount portion 22 comes into contact with the upper end portion 12t of the thin-walled portion 12w. The elastic protrusion portion 301 is formed at the upper end portion of a metal plate 30 folded into a predetermined shape, and is configured to be elastically deformable along the X-axis direction. The metal plate 30 includes a main body portion 302. The main body portion 302 is sandwiched between a holding piece 32 and the frame portion 12. The holding piece 32 constitutes a part of the thin-walled portion 12w.

The holding piece 32 is constituted by a synthetic resin material, for example, and is fixed to the frame portion 12 via a plurality of screw members S1 and S2. The screw members S1 and S2 are attached two by two so as to sandwich the reference hole V of the frame portion 12 therebetween (see FIG. 4A).

The mount portion 22 is fixed to the frame portion 12 by an engaging action of the engaging hole 224 of the protruding piece 223 and the elastic protrusion portion 301. Since the elastic protrusion portion 301 is configured to be elastically deformable in the X-axis direction, it is possible to easily attach the nose pad 20 to the frame portion 12 and detach the nose pad 20 from the frame portion 12.

The holding piece 32 includes an engaging groove 320 (engaging portion) that is engageable with the bridge portion 42 of the correction glasses 40. The engaging groove 320 is formed to extend along the Y-axis direction and have a width equal to or slightly larger than the width of the bridge portion 42. Thus, the correction glasses 40 are disposed at a predetermined position facing the inner surface of the display portion 11. When the mount portion 22 of the nose pad 20 is mounted to the frame portion 12, the mount portion 22 faces the holding piece 32 in the X-axis direction so as to cover the bridge portion 42 engaged with the engaging groove 320.

In this embodiment, the bridge portion 42 of the correction glasses 40 is provided with shaft portions 421 protruding toward the bottom portion of the engaging groove 320 (see FIG. 3). On the other hand, the bottom portion of the engaging groove 320 is provided with hole portions 321 into which the shaft portions 421 are fit (see FIG. 4A). This enables positioning of the bridge portion 42 in the up and down direction and the right and left direction.

In this embodiment, the shaft portions 421 are provided at a plurality of points of the bridge portion 42, but are not limited thereto and may be provided at a single point.

As described above, the holding piece 32 provided to the main body 10 and the mount portion 22 of the nose pad 20 constitute the holding mechanism 50 that holds the correction glasses 40. The holding mechanism 50 fixes the correction glasses 40 to the main body 10 so as to sandwich the bridge portion 42 between the holding piece 32 and the mount portion 22.

[Operation of Head-Mounted Display]

Next, a typical operation of the head-mounted display 100 according to this embodiment configured as described above will be described.

The head-mounted display 100 is used in a state of being mounted on the head of a user. The display portion 11 presents images to the user, the images being projected from the paired optical units 112B and 112L to the display plates 111R and 111L, respectively. In this embodiment, the display plates 111R and 111L are constituted by translucent light guide plates. Thus, the user can visually recognize a forward field of view and a display image at the same time.

The display image may be a 2D image or 3D image. Typically, the optical units 112R and 112L project image data to the display plates 111R and 111L, respectively, the image data being input from a control portion (not shown).

The head-mounted display 100 of this embodiment is configured to be capable of mounting the correction glasses 40 for visual acuity correction. The correction glasses 40 are selected according to the visual acuity of a user. Therefore, a user who does not need visual acuity correction uses the head-mounted display 100 in a state where the correction glasses 40 are detached therefrom.

When the correction glasses 40 are mounted to the main body 10, as shown in FIG. 3, the nose pad 20 is detached from the main body 10. The nose pad 20 is separated from the main body 10 by sliding downward (negative Z direction) with respect to the main body 10. The bridge portion 42 of the correction glasses 40 is then engaged with the engaging groove 320 of the holding piece 32, the engaging groove 320 being exposed at the center portion of the inner surface of the main body 10. At that time, the bridge portion 42 is disposed in the engaging groove 320 such that the shaft portions 421 of the bridge portion 42 are fit into the hole portions 321 of the engaging groove 320.

Subsequently, the nose pad 20 is mounted to the main body 10 again. In order to mount the nose pad 20 to the main body 10, the mount portion 22 of the nose pad 20 is caused to slide upward (positive Z direction) with respect to the main body 10. At that time, when the reference pin 23 of the nose pad 20 is fit into the reference hole V of the main body 10, positioning accuracy of the nose pad 20 with respect to the main body 10 can be ensured.

When the nose pad 20 is further caused to slide in the above-mentioned direction and when the top portion 22t of the mount portion 22 rises up to a position coming into contact with the upper end portion 12t of the thin-walled portion 12w, the elastic protrusion portion 301 is engaged with the engaging hole 224 of the protruding piece 223 inserted into the rectangular hole 12h. Thus, the mount portion 22 is held by the main body 10. At the same time, the pair of projection portion 222p provided at the lower ends of the mount portion 22 are engaged with the pair of engaging holes 12wp provided in the bottom surface of the thin-walled portion 12w, and the flange portion 222 of the mount portion 22 is disposed to cover the lower edge of the thin-walled portion 12w. In this case, the flange portion 222 may be configured to be arranged continuously to the bottom surface of the frame portion 12.

As described above, the head-mounted display 100 of this embodiment is configured such that the correction glasses 40 can be held by the holding mechanism 50 provided between the main body 10 and the nose pad 20. This does not require a complicated mechanical mechanism and enables the correction glasses 40 to be stably held by a simple configuration.

According to this embodiment, since an attaching and detaching direction of the correction glasses 40 with respect to the main body 10 and the attaching and detaching direction of the nose pad 20 with respect to the main body 10 are substantially orthogonal to each other, attaching and detaching operability of the correction glasses 40 with respect to the main body 10 can be improved. Specifically, for example, operational errors such as falling of the correction glasses 40 by mistake when the nose pad 20 is detached can be suppressed.

Further, in this embodiment, the mount portion 22 of the nose pad 20 is configured to cover at least a part of, preferably, the whole of the bridge portion 42 of the correction glasses 40, the bridge portion 42 being engaged with the engaging groove 320 of the holding piece 32. Thus, the designability of an appearance surface around the display portion 11 disposed in front of the eyes of a user can be enhanced.

Additionally, in this embodiment, since the mount portion 22 is formed between the paired pad portions 211R and 211L, it is possible to manufacture various types of nose pads each having a common configuration of the mount portion 22 and an optimized shape of the paired pad portions and the like depending on the user.

According to this embodiment, it is possible to easily attach and detach the nose pad 20 and the correction glasses 40 to and from the main body 10. This facilitates maintenance such as cleaning of the nose pad 20 and care and cleaning of the correction glasses 40 and makes it possible to provide a user-friendly head-mounted display 100.

Second Embodiment

Figure 8:
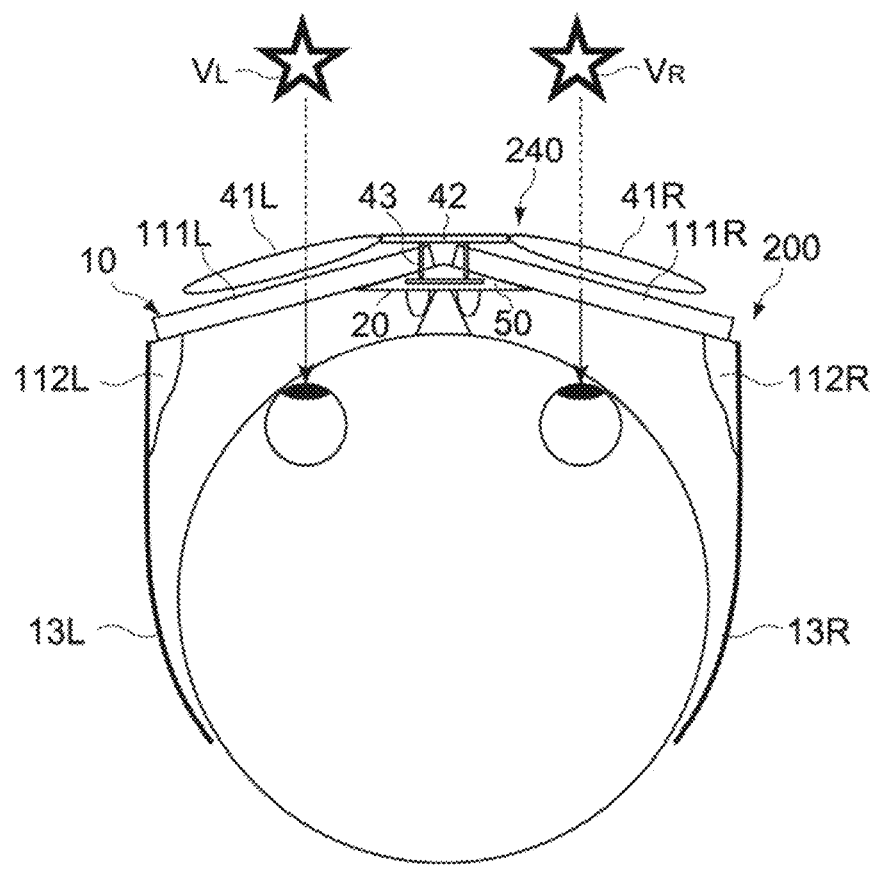
FIG. 8 is a schematic plan view showing a configuration of a head-mounted display according to a second embodiment of the present technology.

FIG. 8 is a schematic plan view showing a configuration of a head-mounted display according to a second embodiment of the present technology. Hereinafter, a configuration different from the first embodiment will be mainly described, and a configuration similar to the embodiment described above will be denoted by similar reference symbols and description thereof will be omitted or simplified.

A head-mounted display 200 of this embodiment includes a main body 10 including a display portion 11, and correction glasses 240. This embodiment is different from the first embodiment described above in that two lens portions 41R and 41L of the correction glasses 240 are disposed on the outer side (front side) of the display portion 11.

Figure 9:
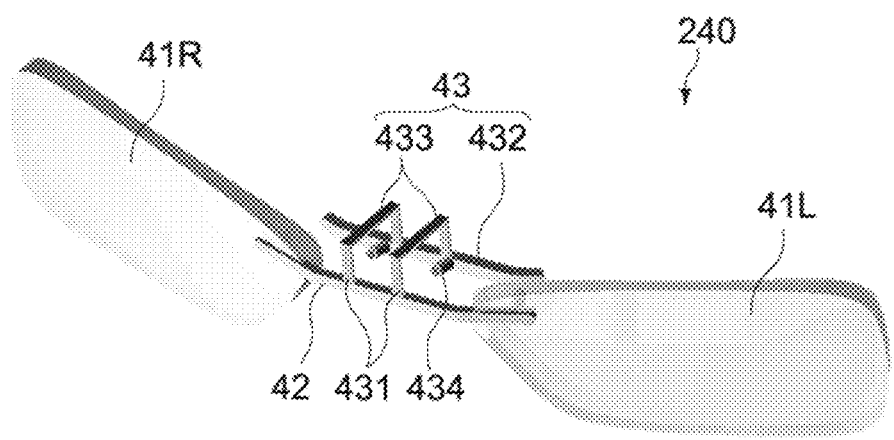
FIG. 9 is a perspective view showing a configuration example of correction glasses in the head-mounted display.

FIG. 9 is a perspective view showing a configuration example of the correction glasses 240. The correction glasses 240 include the two lens portions 41R and 41L, a bridge portion 42, and a suspended portion 43.

The two lens portions 41R and 41L are disposed on the outer side of the display portion 11. As shown in FIG. 8, the lens portions 41R and 41L are disposed on the outer side of display plates 111R and 111L (display portion 11), respectively. The bridge portion 42 is disposed on the outer side of the display portion 11 and couples the two lens portions 41R and 41L to each other. As shown in FIG. 9, the suspended portion 43 includes first end portions 431, a second end portion 432, and bend portions 433. The first end portions 431 are coupled to the bridge portion 42. The second end portion 432 is held by a holding mechanism 50. The bend portions 433 are provided between the first end portions 431 and the second end portion 432 and cross over the main body 10.

In the suspended portion 43, the second end portion 432 is held between a holding piece 32 and a mount portion 22 that constitute the holding mechanism 50. The second end portion 432 is provided with two shaft portions 434 that are fit into hole portions 321 formed in the bottom portion of an engaging groove 320 of the holding piece 32. The suspended portion 43 arranges the lens portions 41R and 41L to face the outer side of the display plates 111R and 111L, respectively, with the second end portion 432 being held by the holding mechanism 50.

In the head-mounted display 200 of this embodiment configured as described above, the lens portions 41R and 41L of the correction glasses 240 are constituted by correction lenses. The correction lenses enable a user who has difficulty in seeing a near view due to hyperopia or the like to easily see a near view. In this case, as shown in FIG. 8, images $V_R$ and $V_L$ (AR images set at infinity) respectively displayed by the display plates 111R and 111L do not pass through the lens portions 41R and 41L, and thus it is possible to correct hyperopia without reducing visibility of the images $V_R$ and $V_L$.

Hereinabove, the embodiments of the present technology have been described, but the present technology is not limited to the embodiments described above and can be variously modified without departing from the gist of the present technology as a matter of course.

For example, in the embodiments described above, the configuration in which the nose pad 20 is caused to linearly slide with respect to the main body 10 to attach and detach the correction glasses 40 is provided. However, instead of this, a configuration in which the nose pad 20 is rotated or flipped up with respect to the main body 10 to enable the correction glasses 40 to be attached and detached may be provided.

Further, in the case where the correction glasses 40 are always mounted, the correction glasses may double as a protective cover of the display plates 111R and 111L. In this case, it is unnecessary to separately provide a protective cover, and a space for providing the correction glasses 40 is obtained. Thus, it is possible to enhance the degree of freedom in arrangement according to the type of glasses.

Further, in the above embodiments, the correction glasses 40 are configured to be attached and detached in a state where the nose pad 20 is separated from the main body 10, but are not limited thereto. For example, in order that the nose pad 20 is not separated from the main body even if the nose pad 20 is operated to slide downward up to a position where the engaging groove 320 of the holding piece 32 is exposed, the nose pad 20 may be configured to be capable of sliding with respect to the main body 10 stepwise in the up and down direction.

Further, the engaging portion provided to the main body 10 is not limited to the engaging groove 320. An appropriate form engageable with the bridge portion 42 of the correction glasses 40 (for example, projection, step portion, and the like) may be adopted.

Additionally, the correction glasses 40 may be configured to be capable of being optimized according to inclination of the display plates 111R and 111L, a facing distance with the display plates 111R and 111L, and the like. Further, a vertex distance may be configured to be adjustable according to the thickness or degree of the correction glasses 40.

It should be noted that the configuration of the correction glasses 40 is not limited to two-point type glasses as described above. The present technology is also applicable to glasses of other types such as a rim type, a browline type, a half-rim type, and an under-rim type.

It should be noted that the present technology can have the following configurations.

(1) A head-mounted display, including:
a main body that includes a display portion capable of presenting an image to a user and is configured to be mountable on a head of the user;
a nose pad that is configured to be attachable to and detachable from the main body; and
a holding mechanism that is capable of holding correction glasses between the main body and the nose pad mounted to the main body, the correction glasses facing the display portion.

(2) The head-mounted display according to (1), in which the holding mechanism includes
an engaging portion that is provided to the main body and is engageable with a bridge portion of the correction glasses, and
a mount portion that is provided to the nose pad, and faces the engaging portion in a first axial direction and covers at least a part of the bridge portion engaged with the engaging portion.

(3) The head-mounted display according to (2), in which the nose pad further includes a pair of pad portions, and the mount portion is formed between the pair of pad portions.

(4) The head-mounted display according to (2) or (3), in which the nose pad is mounted to the main body along a second axial direction orthogonal to the first axial direction.

(5) The head-mounted display according to (4), in which the holding mechanism further includes
a hole portion that is provided to the main body and formed along the second axial direction, and
a shaft portion that is provided to the nose pad and is fit into the hole portion.

(6) A head-mounted display, including:
a main body that includes a display portion capable of presenting an image to a user and is configured to be mountable on a head of the user;
a nose pad that is configured to be attachable to and detachable from the main body;
correction glasses that are disposed to face the display portion; and
a holding mechanism that is provided between the main body and the nose pad mounted to the main body and is capable of holding the correction glasses.

(7) The head-mounted display according to (6), in which the correction glasses include
two lens portions, and
a bridge portion that couples the two lens portions to each other, and
the holding mechanism includes
an engaging portion that is provided to the main body and is engageable with the bridge portion, and
a mount portion that is provided to the nose pad, and faces the engaging portion in a first axial direction and covers at least a part of the bridge portion engaged with the engaging portion.

(8) The head-mounted display according to (7), in which the bridge portion includes a shaft portion protruding in the first axial direction, and
the holding mechanism further includes a hole portion that is formed in a bottom portion of the engaging portion and into which the shaft portion is fit.

(9) The head-mounted display according to any one of (6) to (8), in which
the correction glasses are visual acuity correction glasses.

(10) The head-mounted display according to (6), in which the correction glasses includes
two lens portions that are disposed on an outer side of the display portion,
a bridge portion that couples the two lens portions to each other, and
a suspended portion that includes
a first end portion coupled to the bridge portion,
a second end portion held by the holding mechanism, and
a bend portion provided between the first end portion and the second end portion and crossing over the main body.

DESCRIPTION OF SYMBOLS

10 main body
11 display portion
12 frame portion
20 nose pad
22 mount portion
32 holding piece
40, 240 correction glasses
42 bridge portion
43 suspended portion
50 holding mechanism
100, 200 head-mounted display

The invention claimed is:
1. A head-mounted display, comprising:
a main body that includes a display portion and an elastic protrusion portion that is elastically deformable;
a nose pad that includes a mount portion, wherein
the mount portion includes a reference portion and an engaging hole,
the reference portion is configured to fit into a reference hole in the main body so as to mount the nose pad to the main body, and
the elastic protrusion portion is configured to fit into the engaging hole to detachably mount the nose pad to the main body by a sliding motion of the nose pad with respect to the main body; and
a holding mechanism configured to hold correction glasses between the main body and the nose pad, such that the correction glasses face the display portion and are mounted to the main body.

2. The head-mounted display according to claim 1, wherein the main body further includes a recess configured to slidably receive the nose pad.

3. The head-mounted display according to claim 1, wherein the holding mechanism is further configured to hold the correction glasses such that the correction glasses face an inner surface of the display portion.

4. The head-mounted display according to claim 1, wherein the main body further includes a recess configured to slidably receive the nose pad in a first axial direction orthogonal to a second axial direction.

5. The head-mounted display according to claim 1, wherein the display portion comprises an image forming element.

6. The head-mounted display according to claim 1, wherein the correction glasses are mounted to the main body in an axial direction.

7. The head-mounted display according to claim 1, wherein the elastic protrusion portion is further configured to fit into the engaging hole by the sliding motion of the nose pad with respect to the main body along a first axial direction different from a second axial direction.

8. The head-mounted display according to claim 7, wherein the second axial direction is orthogonal to the first axial direction.

9. A head-mounted display, comprising:
a main body that includes a display portion and an elastic protrusion portion that is elastically deformable;
a nose pad that includes a mount portion, wherein
the mount portion includes a reference portion and an engaging hole,
the reference portion is configured to fit into a reference hole in the main body so as to mount the nose pad to the main body, and
the elastic protrusion portion is configured to fit into the engaging hole to detachably mount the nose pad to the main body by a sliding motion of the nose pad with respect to the main body;
correction glasses; and
a holding mechanism configured to hold the correction glasses between the main body and the nose pad, such that the correction glasses face the display portion and are mounted to the main body,
wherein the correction glasses include:
two lens portions; and
a bridge portion configured to couple the two lens portions to each other.

10. The head-mounted display according to claim 9, wherein the correction glasses are visual acuity correction glasses.

11. The head-mounted display according to claim 9, wherein
the two lens portions are on an outer side of the display portion,
the correction glasses further include a suspended portion, and
the suspended portion includes:
a first end portion coupled to the bridge portion,
a second end portion held by the holding mechanism, and
a bend portion between the first end portion and the second end portion, and that crosses over the main body.

* * * * *